United States Patent Office 2,959,005
Patented Nov. 8, 1960

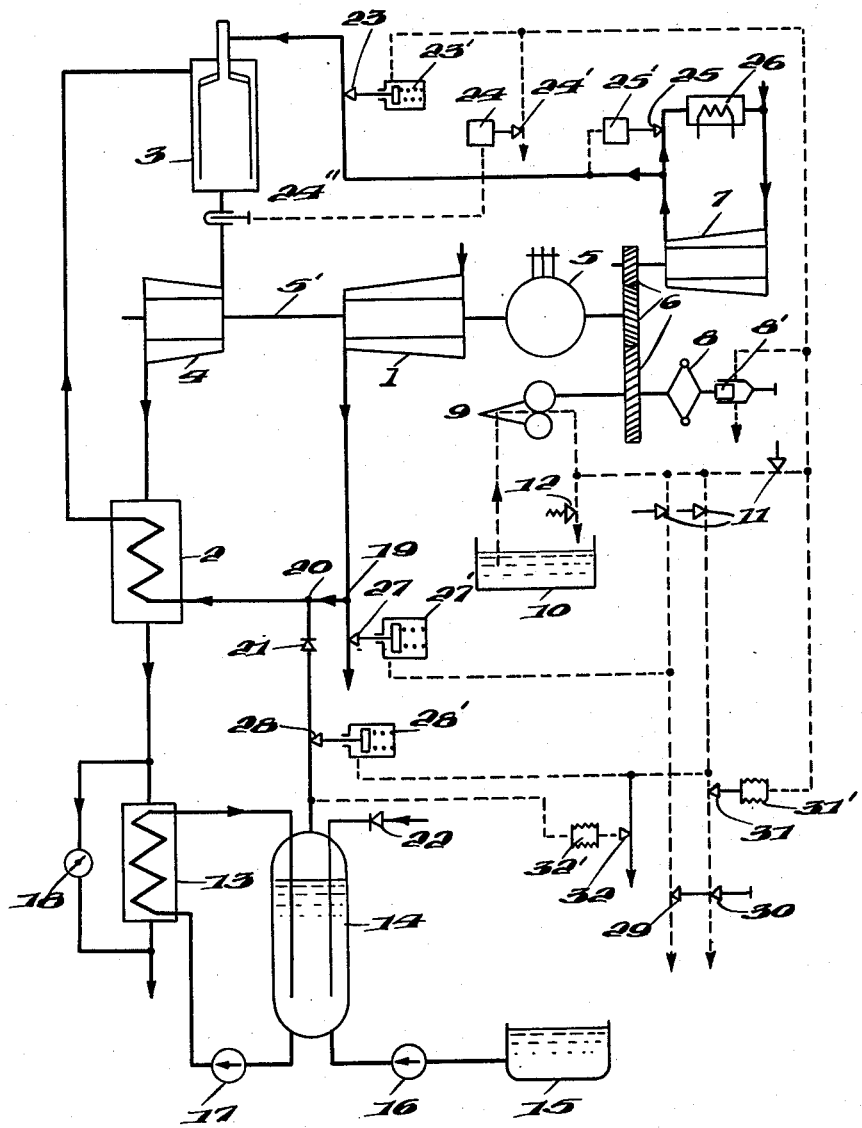

2,959,005

GAS TURBINE PLANT AND METHOD OF OPERATING THE SAME

Tadeusz Zaba, Wettingen, Switzerland, assignor to Aktiengesellschaft Brown, Boveri & Cie, Baden, Switzerland, a joint-stock company Filed May 18, 1959, Ser. No. 813,850

Claims priority, application Switzerland June 4, 1958

1 Claim. (Cl. 60—39.55)

This invention relates to gas turbine plant operation, and is particularly concerned with a method of producing necessary additional power by introducing an additional operating medium into the circuit of a gas turbine plant whilst extracting compressed air from this circuit, as well as an apparatus for performing this method.

In a gas turbine plant it is possible to take part of the air delivered by the air compressor out of the operating medium circuit in order to use it for some special purpose. As a result, the amount of gas flowing through the gas turbine, as well as the pressure of the driving gas in front of the gas turbine and the air pressure after the air compressor, will be smaller; moreover, the power of the gas turbine and thus the useful output of the plant will decrease. Experience shows that when about 25% of the entire amount of air is extracted, the useful power at the shaft of the gas turbine set will drop to zero, whilst simultaneously the pressure after the air compressor sinks from 100% to about 75%.

It is also known to be possible to introduce water vapor or some suitable gas into the operating medium circuit of a gas turbine plant at a suitable point, in order to be able to deal rapidly with load peaks. The amount of gas flowing through the turbine thus becomes greater, the pressure in front of the gas turbine and after the air compressor increases, and the useful power of the gas turbine set is increased. Practical tests show that the useful power increases by about 5% when a quantity of water vapor amounting to 1% is added to 100% air quantity.

When it is required that a supply of compressed air be taken—from time to time—from the operating medium circuit of a gas turbine plant essentially composed of an air compressor, a gas turbine and a useful power machine, the extraction of this compressed air can occur at a bleeding point between two stages of the air compressor; or, at a suitable point in the compressed air line between the air compressor and the combustion chamber. Such air extraction can be required in a chemical or other industrial plant where the useful power machine consists of a current generator; preferably, however, in a steelworks where instead of a current generator an air compressor is part of the assemblage and the air taken from the circuit of the gas turbine plant would, for instance, be used as additional air for supplying the converter. In view of the decrease in output of the useful power machine and the drop in pressure at the air extraction point when air is taken from the circuit of the gas turbine plant, it is not possible to adopt the extracted quantity to suit all requirements; nevertheless, both the pressure of the extracted air and the output of the useful power machine should remain at least approximately constant. This should also be the case when the amount of air taken from the circuit of the gas turbine plant varies.

The object of the present invention is to avoid the aforementioned undesirable effects which occur when air is extracted from the circuit of a gas turbine plant. It concerns a method of producing the required additional power by introducing an additional operating medium into the circuit of a gas turbine plant when compressed air is extracted from this circuit, the assemblage of the plant consisting mainly of an air compressor, a gas turbine and a useful power machine. The procedure according to the invention is characterized by the feature that the introduction of the additional operating medium is regulated in dependence upon the compressed air extraction in such a manner that the output of the useful power machine remains constant.

An arrangement for performing this method, which is also part of the invention, comprises two valves, one of which allows compressed air to be extracted from the circuit of the gas turbine plant whilst the other valve simultaneously regulates the amount of additional operating medium when the same is introduced into this circuit.

The method described for which the regulation of the amount of the additional medium with simultaneous extraction of compressed air from the circuit of the gas turbine plant is essential, can be performed with water vapor by using a steam accumulator. In other words, the amount of air taken from the circuit is replaced by a corresponding amount of steam. The steam accumulator can be supplied from a boiler heated by exhaust gas from the gas turbine or from some other steam source. A certain amount of steam can be taken intermittently from this accumulator and introduced into the circuit of the gas turbine plant, the amount of steam being regulated in such a manner that the output of the useful power machine, either in the form of a current generator or an air compressor, remains constant so that the pressure of the extracted air varies only very slightly.

The method according to the invention is explained by means of the accompanying drawing which shows schematically an apparatus arrangement for performing the method.

In the figure, reference number 1 indicates an air compressor, 2 an air preheater, 3 a combustion chamber, 4 a gas turbine and 5 a useful power machine (e.g., as here, a current generator) of a gas turbine plant, whereby the main elements of the assemblage are thus the air compressor, the gas turbine and the useful power machine. A combustion gas compressor 7 as well as a centrifugal governor 8 and a regulating oil pump 9 are driven from the shaft 5' of the assemblage by way of a gear 6. The governor 8, by means of an associated governor piston 8', influences various oil pressure operated valves as subsequently described in detail. The regulating oil pump 9 takes regulating oil from an oil tank 10 and delivers it by way of throttling devices 11, which can be in the form of orifice plates or adjustable throttle valves, to the regulating oil pipes of the aforementioned valves. Reference numeral 12 indicates a spring-loaded pressure holding valve. The gas turbine 4 and air preheater 2 are connected to the gas side of a waste heat boiler 13 which supplies steam to an accumulator 14. The feed water for the waste heat boiler 13 is taken from a feed water container 15 and delivered by a feed water pump 16 into the accumulator 14, from whence it is passed by a circulating pump 17 to the waste heat boiler 13. By means of a gas bypass 18 it is possible to vary the amount of gas flowing through the waste heat boiler 13. The steam accumulator 14 can, in addition, also be connected to a separate steam source by means of a pipeline including a non-return valve 22.

In the compressed air pipe from the air compressor 1 there is an air extraction point 19, for tapping off air from the circuit of the gas turbine plant, whilst at 20 is indicated a point where steam simultaneously is introduced into the circuit. The steam supply pipe to the point 20 is provided with a non-return valve 21.

The amount of combustion gas which is supplied to the combustion chamber 3 from the combustion gas compressor 7 is regulated by means of governor 8 and regulating piston 8' with the aid of a combustion gas valve 23 and an associated servomotor 23'; furthermore, the amount of combustion gas is also limited by a temperature regulator 24 together with regulating oil discharge valve 24' and temperature feeler 24". To prevent the pressure at the outlet of the combustion gas compressor 7 from becoming too high, a certain amount of gas is passed back through a recooler 26 by way of pressure regulator 25' and valve 25 to the inlet side of combustion gas compressor 7.

For the purpose of producing the required additional power by introducing an additional operating medium— in this case steam—into the circuit of the described gas turbine plant, whilst compressed air simultaneously is taken from this circuit, an extraction valve 27 is arranged in the air extraction pipe after the extraction point 19 and a regulating valve 28 is arranged in the steam supply pipe in front of the inlet point 20: these valves are each actuated by a servomotor 27' and 28' respectively. Furthermore, each oil discharge pipe for the regulating oil pipes of the aforesaid servomotors is provided with a discharge valve 29 and 30 respectively. These latter valves are actuated simultaneously either manually or, if desired, automatically by means of a pressure- or quantity-regulating device. When these valves are closed then, as required, extraction valve 27 is opened and compressed air is taken from the circuit of the gas turbine for external use, whilst at the same time regulating valve 28 is opened and steam is introduced into this circuit as additional operating medium. Both valves 27 and 28 open and close in such a manner that the output of the useful power machine remains constant, whilst the pressure of the useful air at the extraction point varies only very slightly. The amount of steam which is introduced into the circuit for this purpose is limited by the centrifugal governor 8 with the aid of regulating valve 28 and of an oil discharge valve 31 which is for instance actuated by pressure bellows 31'. In addition this quantity of steam, when the pressure in the steam accumulator 14 drops, is also limited by an oil discharge valve 32 with associated pressure bellows 32'.

Instead of steam, a suitable pressure gas can be used as additional operating medium, e.g., gas supplied from a free-piston gas producer. The pressure of this gas must be higher than the pressure of the operating medium at the point of introduction. The introduction of this gas into the circuit of the gas turbine plant can, for instance, occur at the combustion chamber.

I claim:

In a gas turbine plant essentially including a gas compressor, a gas turbine in circuit with said gas compressor and a useful power machine driven by said gas turbine, the combination which comprises a source of steam, a steam accumulator, a first valved conduit communicating between said steam accumulator and the pressure side of said gas compressor, a second valved conduit communicating between the pressure side of said gas compressor and a point of use of compressed gas, and governing means for regulating the quantity of steam added to the circuit through said first valved conduit to correspond with the quantity of compressed gas diverted from said circuit through said second valved conduit, whereby the output of said useful power machine remains constant.

References Cited in the file of this patent

UNITED STATES PATENTS

| | | |
|---|---|---|
| 2,441,751 | Broggi | May 18, 1948 |
| 2,454,358 | Traupel | Nov. 23, 1948 |
| 2,496,407 | Pfenninger | Feb. 7, 1950 |
| 2,551,229 | Alford et al. | May 1, 1951 |
| 2,741,422 | Kockritz et al. | Apr. 10, 1956 |